United States Patent [19]
Eid et al.

[11] Patent Number: 6,115,654
[45] Date of Patent: Sep. 5, 2000

[54] UNIVERSAL SENSOR INTERFACE SYSTEM AND METHOD

[75] Inventors: Bradley Franz Eid, Essex Junction; Scott Robert Durkee, New Haven; Keith Patrick Darwin, Ferrisburg, all of Vt.

[73] Assignee: Simmonds Precision Products, Inc., Akron, Ohio

[21] Appl. No.: 08/997,271

[22] Filed: Dec. 23, 1997

[51] Int. Cl.[7] .............................. G06F 19/00; G06F 7/00
[52] U.S. Cl. ............................ 701/34; 701/29; 701/35; 280/735; 340/945; 342/385; 244/1
[58] Field of Search .................. 701/34, 29, 35; 342/385; 280/735; 340/945; 244/1

[56] References Cited

U.S. PATENT DOCUMENTS

| | | | |
|---|---|---|---|
| 5,357,141 | 10/1994 | Nitschke et al. | 307/10.1 |
| 5,371,487 | 12/1994 | Hoffman et al. | 340/425.5 |
| 5,754,963 | 5/1998 | Nunneley et al. | 701/34 |
| 5,809,437 | 9/1998 | Breed | 701/29 |
| 5,819,188 | 10/1998 | Vos | 701/4 |
| 5,828,969 | 10/1998 | Chamney et al. | 701/29 |
| 5,838,261 | 11/1998 | Lauta et al. | 340/945 |

*Primary Examiner*—William A. Cuchlinski, Jr.
*Assistant Examiner*—Olga Hernandez
*Attorney, Agent, or Firm*—Calfee, Halter & Griswold

[57] ABSTRACT

A universal sensor interface system that utilizes a common hardware and software interface to drive many types of sensors. A variety of stimulation signals are generated that are transmitted to a plurality of sensors. The stimulation signals cause the sensors to generate response signals in the form of parametric measurements, which are then converted into a common format. The sensor response signals are processed and output as usable inputs to a data consuming apparatus. A method of automatically determining the sensor configuration in an aircraft sensor system is also provided. During operation the host computer system or digital signal processor is programmed to analyze sensor response signals to detect sensor faults, help predict sensor failures, and determine if there has been a sensor error. The universal sensor interface system is also capable of notifying a system operator of wiring problems with a particular sensor or if a particular sensor is malfunctioning.

54 Claims, 6 Drawing Sheets

Microfiche Appendix Included
(1 Microfiche, 15 Pages)

UNIVERSAL SENSOR INTERFACE SYSTEM AND METHOD

A Microfiche Appendix consisting of 1 sheets (15 total frames) of microfiche is included in this application. The Microfiche Appendix contains material which is subject to copyright protection. The copyright owner has no objection to the facsimile reproduction by any one of the Microfiche Appendix, as it appears in the Patent and Trademark Office patent files or records, but otherwise reserves all copyright rights whatsoever.

FIELD OF THE INVENTION

This invention relates to sensor interface systems and, more particularly, to a universal sensor interface capable of providing common hardware and software to control a multiplicity of sensors.

BACKGROUND OF THE INVENTION

The use of various types of sensors and systems which control sensors on most modern vehicles is well known in the art. There are many different types of sensors on the market that are currently used to measure such items as temperature, acceleration, load, deformation, stress, excitation, fuel quantity and altitude, to name just a few. Various methods of using these types of sensors are well known in the art and there are several systems that use multiple combinations of sensors throughout transportation vehicles.

In these prior art sensor systems each sensor utilized in the system is typically incorporated with a circuit that creates a drive signal to excite the sensor. These drive circuits commonly consist of a first set of analog circuits that provide a particular sensor with an analog excitation signal. Once the sensor being driven receives the analog excitation signal the sensor will generate a response signal which is communicated to a second set of analog circuits. After leaving the second set of analog circuits, which is connected with the output of the sensor being driven, the output signal is fed to the instrument associated with displaying or controlling the parameter measured.

Some of the systems currently employed with these sensors use microprocessors to control the sensor system. In these systems, a microprocessor is connected with a digital to analog converter which creates the analog drive signal used to excite the sensors. In addition, an analog to digital converter is usually connected to the output of the sensor being driven to convert the response signal received by the sensor back to a digital format. After the response signal is converted to a digital signal it is communicated as an input to the microprocessor. Once the response signal is converted to a digital signal and received by the microprocessor, parametric measurement contained in the response signal is used to control an instrument or control system much like the above-described analog system.

The problem with these prior art systems is that each sensor system utilizes its own unique set of circuitry to control each unique sensor. For example, the circuitry used to drive an accelerometer is separate and independent of the circuitry used to control temperature sensors. The lack of a standard sensor interface increases manufacturing and maintenance costs due to the increase in the number of components necessary to build and operate each individual sensor's circuitry. In addition, since each sensor is associated with a separate instrument or control system, other systems on a vehicle cannot utilize or incorporate the information being gathered by another sensor system. Additionally, as the number of components increases so does the likelihood of system failure because the reliability of each system depends on the reliability of each component used in that system.

Due to the complexity of modern aircraft systems, a need exists for a universal sensor interface system that can provide common hardware and software to drive a variety of different sensors. This system should be able to communicate with a multiplicity of sensor types in a common communications format without the necessity of using several kinds of different circuits to control each individual sensor. A universal sensor interface that requires less components also improves the reliability of the overall sensor system. A more versatile and robust sensor interface is desired that will give users of sensor systems the ability to quickly modify and adapt current sensor interfaces to new types of sensors without having to replace entire sensor systems. Thus, a universal sensor interface is needed that can communicate with almost any sensor type without requiring separate circuitry to control each type of sensor used in the sensing system.

SUMMARY OF THE INVENTION

The present invention solves the above problems with prior art systems by providing a universal sensor interface system and method. According to the system of the invention, means are utilized for generating a variety of stimulation signals that are transmitted to a plurality of sensors. The stimulation signals cause the sensors to generate a response signal in the form of a parametric measurement which is then converted into a common format by a means for accepting said sensor response signals. Finally, the response signals are output as usable inputs to a data consuming apparatus.

In another aspect of the invention, a method is disclosed for providing a universal sensor interface to an aircraft. At least one digital signal processor is in communication with a host computer system and at least one sensor. The sensor may be of any type capable of generating aircraft system signals. The sensors are controlled by a stimulation signal which is generated by the digital signal processor. This signal causes a response signal to be output from the sensors which is communicated to an input port of the digital signal processor. The digital signal processor then converts the aircraft system response signal into a parametric measurement which is communicated to the host computer system for further processing.

According to yet another aspect of the invention, a method is disclosed for automatically determining the sensor configuration in an aircraft sensor system. In order to automatically determine sensor configurations a plurality of initialization signals are sent from the host computer system to the digital signal processor. The digital signal processor then converts the initialization signals into a plurality of sensor check signals and communicates these signals to each sensor. The sensor's response signal is communicated to the host computer system, which determines the type of sensor installed by comparing each of the sensor response signals with a pre-selected database of sensor responses. Based on the sensor response signals, the host computer system is then able to select the appropriate sensor based on the comparison.

A further aspect of the present invention discloses a method of initializing a universal sensor interface system. A plurality of arbitrary initialization signals are generated with a host computer system. The arbitrary initialization signals are then output to a digital signal processor which transforms the arbitrary initialization signal into a sensor stimulation signal. The sensor stimulation signal is then directed to the inputs of a plurality of sensors. After receiving the sensor stimulation signal, the sensors will generate an initialization response signal which is communicated back to the digital signal processor. The initialization response signal from each sensor is then interpreted according to a predetermined set of sensor responses to select the appropriate type of sensor.

In yet another aspect of the present invention, a universal sensor interface system for an aircraft measurement and control system is disclosed. The universal sensor interface system utilizes a central processing unit for communicating system information to the aircraft measurement and control systems. The central processing unit is equipped with a plurality of communication ports in communication with at least one universal sensor interface unit. The universal sensor interface unit has a digital signal processor with a communication port in contact with at least one communication port on the central processing unit. A mixed signal unit is in communication with the digital signal processor for generating stimulation signals and receiving response signals from the sensors.

The universal sensor interface can support a wide variety of sensors commonly used to measure aircraft sensor parameters. The universal sensor interface utilizes a common set of hardware and software to drive many different sensors, thereby eliminating the need for several types of circuits to drive different sensing systems. The system is also configured to interface with sensors developed in the future due to the versatility of the design.

Other aspects of the present invention include the ability of the universal sensor interface to analyze sensor response signals to detect many different sensor parameters and report them to a system operator. During operation the host computer system or digital signal processor is programmed with a means for analyzing sensor response signals to detect sensor faults, help predict sensor failures, and determine if there has been a sensor error. The universal sensor interface system is also capable of notifying a system operator of a wiring problem with a particular sensor or if a particular sensor is simply malfunctioning.

These and other features and advantages of the invention will become apparent upon a review of the following detailed description of the presently preferred embodiments of the invention viewed in conjunction with the appended drawings.

DETAILED DESCRIPTION OF THE PRESENTLY PREFERRED EMBODIMENTS

Figure 1:
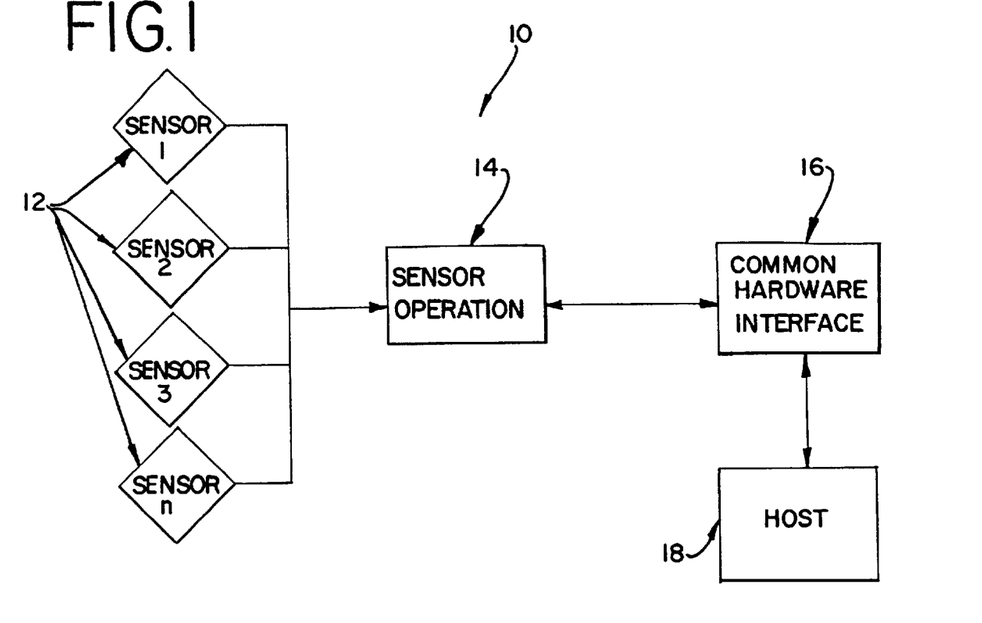
FIG. 1 is a block diagram of a generalized version of a universal sensor interface system.

The presently preferred embodiment of the invention shown in FIG. 1 discloses a universal sensor interface 10 that allows system designers to use common hardware and software to operate a multiplicity of sensors 12. While the disclosure that follows is directed toward aircraft systems, one skilled in the art would recognize that a universal sensor interface 10 can be utilized in a variety of other vehicles and systems. For example, in addition to aircraft systems, the universal sensor interface 10 may be used to monitor measurement and control systems in cars, trucks, trains, boats and manufacturing facilities, just to name a few.

The universal sensor interface 10 offers designers the ability to integrate a variety of sensors with consumers of sensor data in aircraft measurement and control systems. The universal sensor interface 10 is capable of generating an arbitrary but precisely controlled waveform for powering a plurality of sensors. The interface 10 has the ability to rapidly acquire sensor output signals based on individual sensor stimulation, and convert the acquired signals into parametric measurements. The parametric measurements can then be transmitted and utilized in virtually any sensor-based system in a common format.

As illustrated in FIG. 1, at least one sensor 12 is utilized in each universal sensor interface system 10 that can be used to measure a variety of aircraft system parameters. Some of the more commonly used sensors in aircraft systems include capacitance, ultrasonic, temperature, acceleration, visual, pressure and point-level sensors. In order to stimulate and receive response signals from each of the sensors 12, the universal sensor interface system 10 is coupled with a means 14 for selectively operating a sensor 12 on command. The means 14 for selectively operating the sensors 12 is capable to communicate unique stimulation signals to each sensor 12 and is controlled by a common hardware interface unit 16.

The common hardware interface unit 16 selectively stimulates and receives response signals from each of the sensors 12 on board the aircraft. The response signal from each sensor 12 can be utilized directly by the common hardware interface unit 16, or it may be communicated to a host computer system 18. The common hardware interface unit 16 has the ability to perform a variety of tasks while communicating with several sensors 12. The system thus remains very versatile and adaptable to a variety of systems. In the preferred embodiment, the common hardware interface unit 16 may consist of a microprocessor or digital signal processor based system.

During operation of the universal sensor interface 10, each sensor 12 is selectively excited with a stimulation signal generated by and communicated from the common hardware interface unit 16. The stimulus signal is supplied to the sensors 12 by the means 14 for selectively operating each sensor 12. Once the stimulus signal is received by the sensor 12, a response signal is generated and communicated to the common hardware interface 16 by the means 14 for selectively operating each sensor 12. The sensor 12 response signal may be manipulated and consumed by the common hardware interface 16, or further communicated to a host computer system 18 that can be coupled to the common hardware interface 16.

Sensors 12 used in a universal sensor interface system 10 may be grouped according to the type of electrical waveforms associated with the sensor. The presently preferred classifications of sensors which the universal sensor interface 10 can drive alternating current ("AC"), direct current ("DC") and constant current ("CC") sensors. As those skilled in the art will appreciate, the AC sensors are excited by time-dependent voltage sources and the DC sensors are powered by a DC voltage source in normal operation. The CC sensors are thus powered by a constant current source in normal operation. A detailed discussion of the generation of these signals by the universal sensor interface 10 is set forth below.

The universal sensor interface 10 provides stimulation signals to excite the variety of sensors 12 to which it is coupled. In addition to driving the sensor 12 for normal operation of the sensor, stimulus waveforms may also be used for fault detection or sensor identification. The response waveforms emanate from the sensors 12 after excitation from the universal sensor interface 10.

Figure 2:
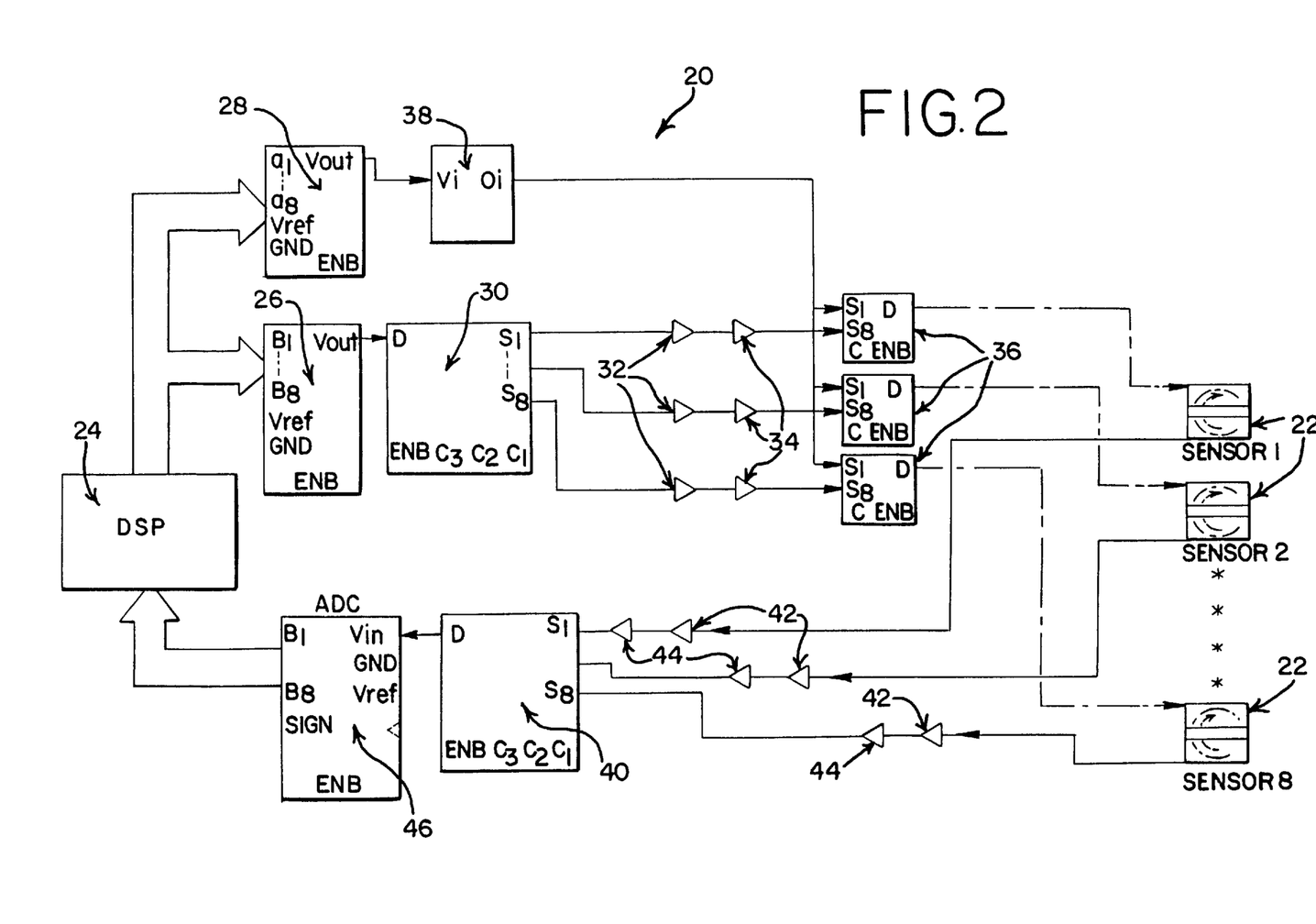
FIG. 2 is a detailed schematic diagram of a preferred embodiment of the universal sensor interface controlling a plurality of sensors.

A preferred embodiment of a universal sensor interface system 20 having at least one sensor 22 is illustrated in FIG. 2. In this embodiment, a digital signal processor ("DSP") 24 is used to selectively detect and drive the plurality of sensors 22 within the system 20. In order to initialize and drive said sensors 22, the DSP 24 is coupled to a first digital to analog converter 26 and a second digital to analog converter 28. The first digital to analog converter 26 is used by the DSP 24 to select the desired sensor 22 to be driven by the stimulation signal. The output of the first digital to analog converter 26 is coupled to a latched multiplexer 30 having a plurality of output channels.

As illustrated in FIG. 2, the latched multiplexer 30 has a plurality of output channels that become energized when a predetermined analog signal is applied to the input of the latched multiplexer 30. Each output channel of the latched multiplexer 30 may be coupled to a filter 32, and a selectable gain amplifier 34 to further condition and protect the output signal from noise. Although not shown, the selectable gain amplifiers 34 may also be coupled to the DSP 24 so that the DSP 24 can automatically control the amplification of the analog output signal from the latched multiplexer 30. Regardless, the first digital to analog converter 26 is coupled with a current/voltage multiplexer 36, which generates the stimulus signal communicated to each sensor 22.

The second digital to analog converter 28 is used by the DSP 24 to control the current level of the stimulus supplied to each sensor 22. In the preferred embodiment shown in FIG. 1, a voltage controlled current source 38 is coupled with the output signal from the second digital to analog converter 28, and on an input of the current/voltage multiplexer 36. A single voltage controlled current source 38 may be used for each individual sensor 22 on the universal sensor interface system 20. As those skilled in the art will appreciate, however, only one voltage controlled current source 38 need be utilized for the entire group of sensors 22.

The voltage controlled current source 38 is preferably able to supply a controlled amount of current to the current/voltage multiplexer 36 in response to stimulus signals received from the second digital to analog converter 28. During operation, the current/voltage multiplexer 36 uses the stimulus signal received from the latched multiplexer 30 and the voltage controlled current source 38 to create a predetermined output signal, which is communicated to the selected sensor 22. Therefore, in order for a sensor 22 to receive a stimulation signal, both the latched multiplexer 30 and the voltage controlled current source 38 must provide a signal to the inputs of the selected voltage multiplexer 36.

To generate a CC drive signal, the DSP 24 sets the voltage output on the voltage controlled current source 38 via the second digital to analog converter 28. After this operation is performed, the DSP 24 selects an output channel of the latched multiplexer 30, via the first digital to analog converter 26, to select an appropriate sensor 22. In this implementation, only one voltage controlled constant current source 38 is available to all channels. Preferably, therefore, the voltage controlled constant current source 38 should be used to drive only one sensor at a time. However, one skilled in the art will realize that a plurality of voltage controlled constant current sources 38 could be utilized to drive the sensors 22 with only minor modifications.

In order to drive the DC sensors 22 utilized in the universal sensor interface 20, the DSP 24 uses the first digital to analog converter 26 to output a constant voltage level to an input on the latched multiplexer 30. The output channels of the latched multiplexer 30 is coupled with each sensor 22, and each output is controlled by the voltage level applied by the first digital to analog converter 26. The latched multiplexer 30 has latched output channels so the DSP 24 only needs to perform one operation to set the voltage level on the input of the latched multiplexer 30. As previously stated, the analog amplifiers 34 coupled with the output channels of the latched multiplexer 30 are designed with selectable gain, which is preferably controlled by the DSP 24.

To generate an arbitrary time-varying waveform to drive the AC driven sensors utilized in the universal sensor interface 20, the DSP 24 selects the appropriate channel on the latched multiplexer 30 using the first digital to analog converter 26. As previously noted, this operation selects the sensor 22 to be driven because each sensor 22 is connected to an output channel of the latched multiplexer 30. Once this is accomplished, the DSP 24 sets the gain on the analog amplifier 34 and the cut-off frequency on the filters 32. The waveform can then be generated from the DSP 24 and output via the first digital to analog converter 26. Depending on the capabilities of the digital to analog converter 26 and the DSP 24, more than one sensor 22 could be driven simultaneously with any time-varying waveform by the universal sensor interface 20.

The response signal resulting from the stimulation signal applied to a selected sensor 22 is communicated to an input multiplexer 40, which is coupled with the sensors 22. A second set of filters 42 and selectable gain amplifiers 44 may be coupled with the output of the sensors 22 and the input multiplexer 40 for conditioning and filtering the response signal. The selectable gain amplifiers 44 may also be coupled with the DSP 24 so that the amplification of the sensor 22 response signal can be further controlled. The output of the input multiplexer 40 is coupled with the input of an analog to digital converter 46, which converts the sensor 22 response signal from an analog signal to a digital signal the DSP 24 can interpret. As such, the output of the analog to digital converter 46 is coupled with an input on the DSP 24 so that the response signal carrying a parametric measurement from the sensors 22 can be communicated to the DSP 24.

In operation, the universal sensor interface system 20 is programmed to control the DSP 24 to issue a digital stimulus signal that is communicated via the first digital to analog converter 26 and the second digital to analog converter 28. Based on the information contained in the digital stimulus signal received from the DSP 24, the first digital to analog converter 26 will generate a predetermined analog output voltage, which causes a predetermined output channel on the latched multiplexer 30 to be energized. The latched multiplexer 30 has a plurality of outputs that can be energized selectively based on the voltage level communicated by the first digital to analog converter 26. The output signal from a channel on the latched multiplexer 30 is the means used to selectively control what sensor 22 will receive a particular stimulus signal.

The second digital to analog converter 28 further generates a second analog stimulus signal based on the signal received from the DSP 24. This second stimulus signal is communicated to an input on the voltage controlled current source 38. The output of the voltage controlled current source 38 is coupled with the current to the voltage multiplexer 36. In order for a sensor 22 to generate a response signal, the latched multiplexer 30 and the voltage controlled current source 38 must both apply a stimulus signal to the selected voltage multiplexer 36, which in turn will cause the voltage multiplexer 36 to generate an analog stimulus output signal that is communicated to the sensors 22. As previously stated, the latched multiplexer 30 is used to control which sensor 22 will receive the stimulus, and the voltage controlled current source 38 controls the size and duration of the stimulus signal delivered to the selected sensor 22.

Figure 3:
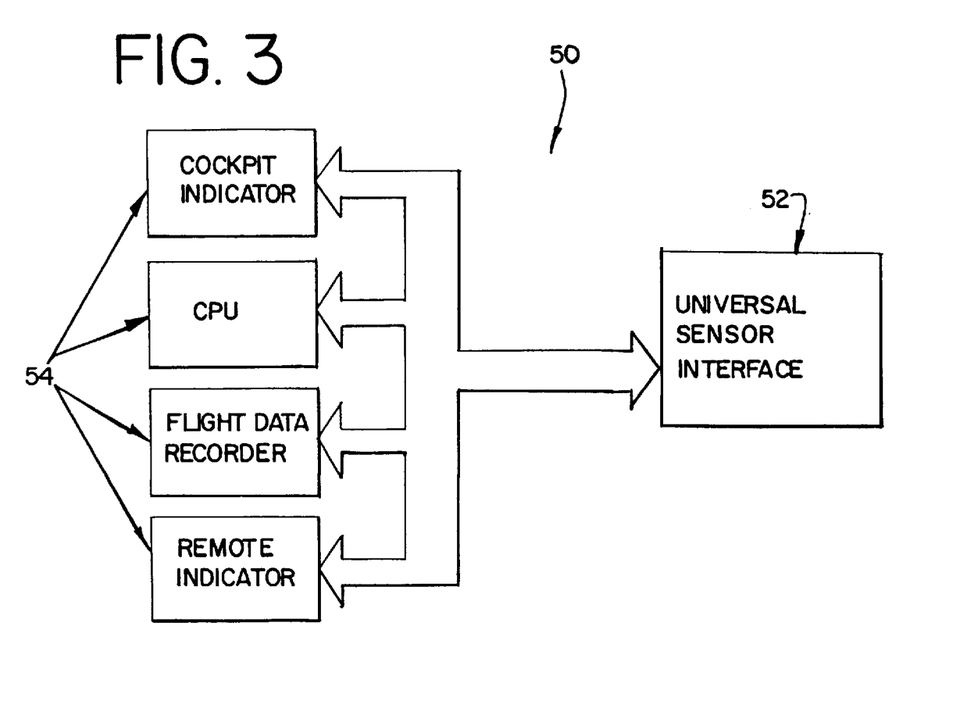
FIG. 3 is a diagrammatic representation of a universal sensor interface system connected with an airplane's measurement and control system.

An aircraft measurement and control system 50 is depicted in FIG. 3 utilizing a universal sensor interface system 52 to communicate with various aircraft measurement and control systems 54 on board an aircraft. The universal sensor interface 50 can preferably communicate with any sensor system commonly found on board an aircraft that consumes sensor data. For example, some of the measurement and control systems on an aircraft that could utilize data from the universal sensor interface system 52 are the cockpit indicator (not shown), a central processing unit (not shown), a flight data recorder (not shown), or a remote indicator (not shown), to name a few. The embodiment of the aircraft measurement and control system 50 depicted in FIG. 3 is preferably employed with smaller aircraft systems.

Figure 4:
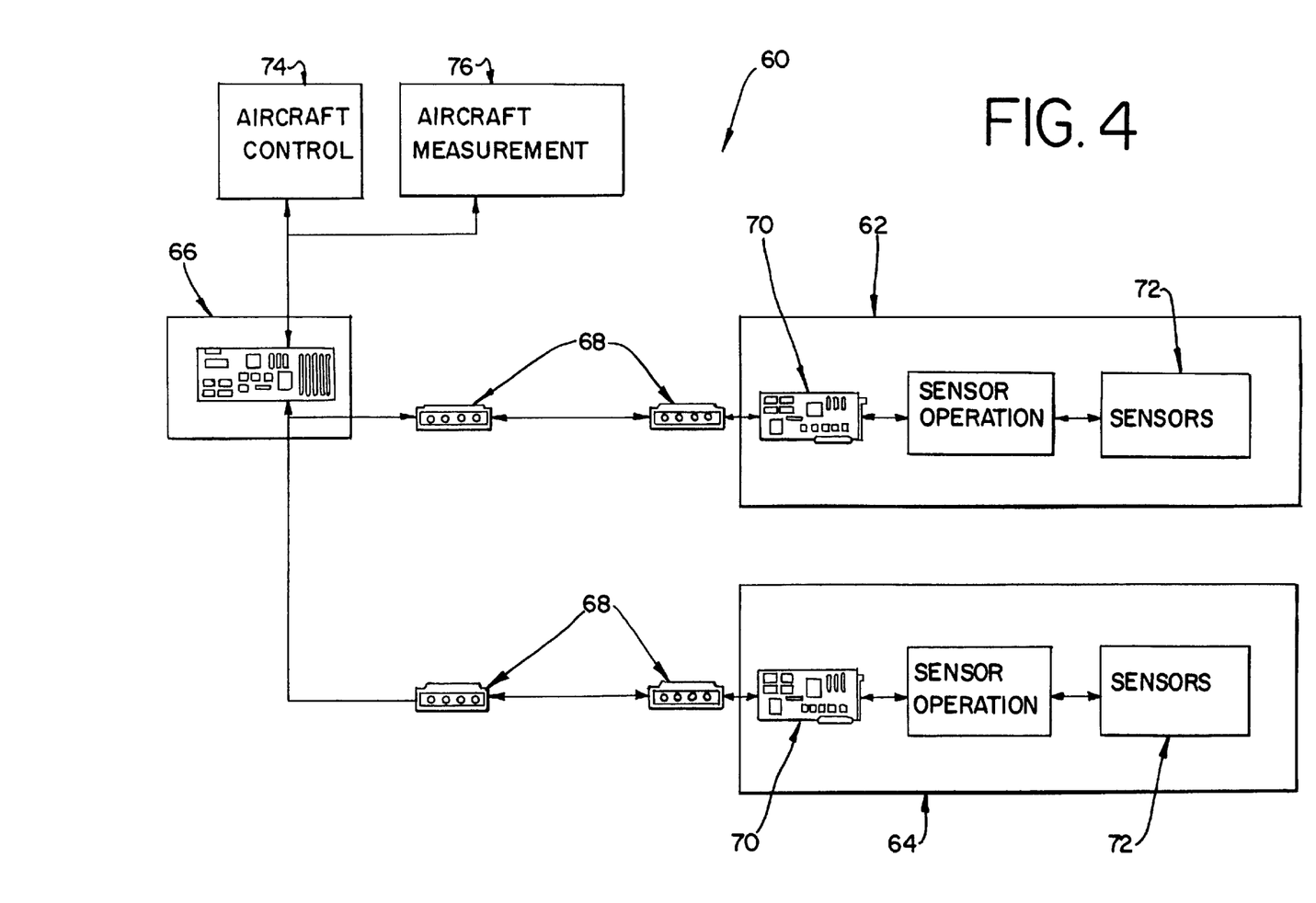
FIG. 4 is a diagrammatic illustration of a plurality of universal sensor interface units coupled to an aircraft measurement and control system.

A universal aircraft measurement and control system 60 which can handle a multiplicity of universal sensor interface units 62, 64 is depicted in FIG. 4. As illustrated, a multiplicity of universal sensor interface units 62, 64 may be coupled to a host computer system 66 that monitors and controls aircraft systems. The host computer system 66 communicates with the universal sensor interface units 62, 64 through a plurality of serial ports 68 coupled to the outputs of the universal interface units 62, 64. Those skilled in the art would recognize that many methods exist to communicate data from one system to another and that serial ports 68 represent only one means for communicating digital data between systems. Other common examples include parallel ports (not shown) or small computer systems interface parts (not shown), to name a few.

In operation, each universal sensor interface 62, 64 receives control signals from the host computer system 66. The control signals control the generation of stimulus signals, which drive the universal sensor interfaces 62, 64. In addition, the host computer system 66 receives response signals generated by the universal sensor interfaces 62, 64 and processes the parametric measurements of these signals for communicating with other aircraft systems. This networking arrangement allows for multiple universal sensor interface units 62, 64 to be coupled to the host computer system 66 thereby allowing aircraft system designers to incorporate as many sensing devices as needed into an aircraft sensor system. Once all of the available sensor connections are in use on a universal sensor interface unit 62, 64 an additional unit may thus be added to give additional sensing power to the aircraft system. Further, should the processing power of host computer system 66 become overwhelmed, the universal sensor interface unit 62, 64 may also be connected with another computer.

In the presently preferred embodiment, a universal sensor interface 62, 64 can accomplish a variety of tasks that were impractical or impossible in prior art sensor systems. A DSP 70 is used in preferred embodiments of the universal sensor interface units 62, 64 because the DSP 70 can act as a generic programmable signal source for driving sensors 72 as well as a computation engine for processing sensor 72 response signals. While these processes can be accomplished on current non-DSP systems, the DSP 70 provides the throughput and control required to accomplish necessary tasks in real-time. In addition, the DSP 70 is compatible with most modern types of sensors 72 thereby making the DSP 70 a very versatile and reliable processing engine. In the preferred embodiment of the invention, the universal sensor interface 62, 64 may also incorporate a microprocessor (not shown) to help facilitate the implementation of old and new algorithms. Microprocessor-based digital signal processing thus brings additional capabilities to the universal sensor interface 62, 64.

The universal sensor interface 62, 64 provides a common interface for the integration of sensors 72 with systems that consume data in an aircraft control 74 or aircraft measurement 76 system. Using a universal sensor interface 62, 64 gives sensor systems designed for aircraft the ability to be aircraft and sensor 72 independent. A universal sensor interface 62, 64 is capable of generating an arbitrary, but precisely controlled, waveform for stimulating various sensors 72. The DSP 70 in the universal sensor interface 62, 64 is capable of generating a large number of arbitrary waveforms to stimulate the various sensors 72. In addition, the universal sensor interface system 62, 64 is able to acquire sensor 72 response signals and convert the response signals into a parametric measurement that is transmitted in a common digital format to the host computer system 66.

Theoretically, the universal sensor interface 62, 64 could be built with a finite number of discrete circuits each designed for a specific class of sensors 72. However, in order to minimize the number of discrete circuits required to accommodate the large number of sensors 72 used in modern aircraft systems, the DSP 66 is preferred. Algorithms and computer programs for digitally generating and manipulating waveforms with a DSP 66 are well documented in prior art systems and signal-processing texts. A microprocessor-based system could also control a universal sensor interface in much the same fashion.

Figure 5:
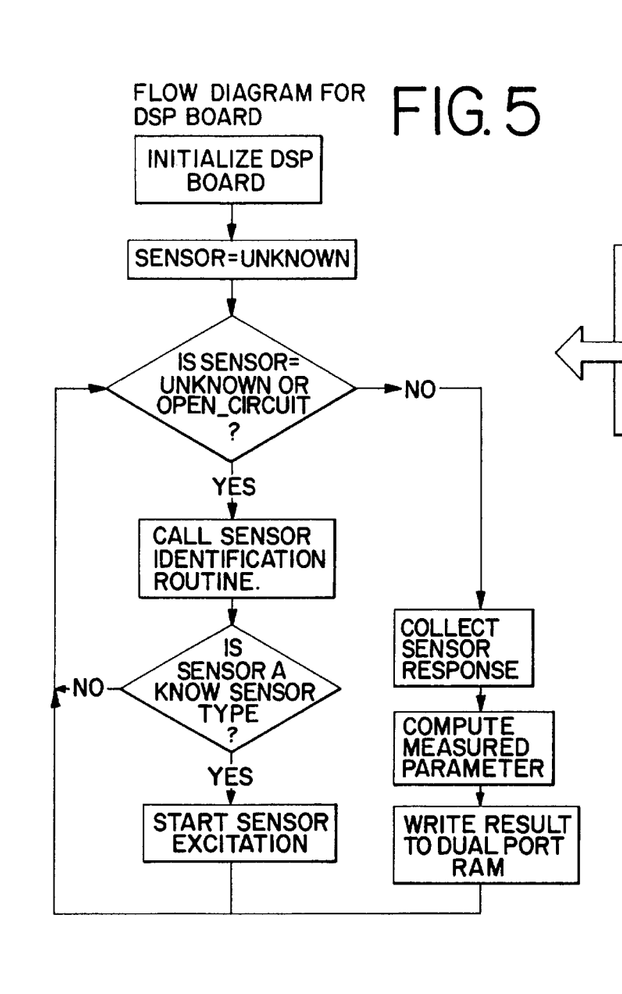
FIG. 5 is a flow chart of the initialization sequence of the presently preferred program for use with the universal sensor interface.

During startup of any aircraft system, it is essential that an initialization sequence is performed in order to determine if the aircraft systems are functioning properly. The universal sensor interface 62, 64 is provided with a method of initializing itself which automatically performs a comprehensive system check. A sample flow chart diagram depicting the control of the universal sensor interface 62, 64 is shown in FIG. 5. In order to initialize the universal sensor interfaces 62, 64, the host computer system 66 preferably causes a plurality of arbitrary initialization signals to be generated and sent to the DSP 70. The DSP 70 then converts the arbitrary initialization signals sent by the host computer system 66 into an analog stimulus signal which drives the various sensors 72.

The response signals which are then output from each sensor 72 in response to receiving the stimulus signal is communicated back to the DSP 70. Before reaching the DSP 70, however, the analog response signal is converted into a digital response signal, which the DSP 70 can interpret. The digital response signal communicates a parametric measurement from each sensor 72 that is equivalent to a sensor 72 signature. The sensor 72 signature signal is then communicated to the host computer system 66 for processing.

The host computer system 66 is preferably capable of interpreting the signature signal received from the selected sensor 72 through a predetermined set of sensor 72 signatures stored on the host computer system 66. The predetermined set of sensor 72 signatures are generated during testing procedures and in the preferred embodiment of the invention are stored in a look-up table on the host computer system 66. During testing of the sensors 72 to be used in the universal sensor interface system 60 a wide range of data on the operation of a sensor 72 can be obtained and thus stored for later reference in the manner described above.

The host computer system 66 is preferably capable of performing a variety of functions with the signature signal received during the initialization sequence. The universal sensor interface 62, 64 preferably stimulates the sensors 72 in such a way that software running on the host computer system 66 is able to determine the type of sensor connected to the universal sensor interface 62, 64. Automatic sensor 72 recognition is accomplished by the host computer system 66 by comparing the signature signal received from the sensors 72 with the predetermined set of sensor 86 signatures obtained during testing. Based on the results of the initialization sequence, therefore, the host computer system 66 can notify a technician of a faulty initialization response through any suitable display means known in the art.

During normal operation, the universal sensor interface system 60 is preferably also capable of performing a variety of functions in addition to automatic sensor 72 recognition. The universal sensor interface 62, 64 can be programmed to notify a user of a faulty response signal, a wiring problem, a malfunctioning sensor, and pin connector assignments that must be reconfigured for a particular sensor 72. The universal sensor interface system 70 can also be programmed with sensor 72 fault detection and isolation abilities. For example, a few of the faults that commonly occur in aircraft sensor 72 systems are an open circuit, a short circuit, an ultrasonic sensor delamination, or an accelerometer becoming inoperative. In any of these events, the universal sensor interface system 60 is preferably able to detect these problems and generate a user output signal that will guide a technician to the exact source of trouble.

Figure 6:
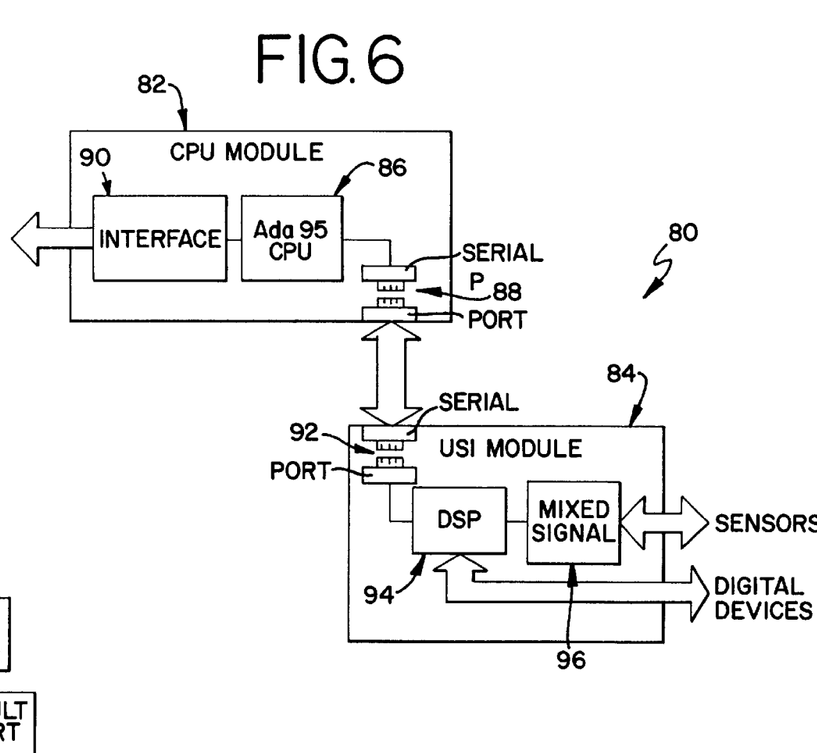
FIG. 6 is a block representation of a universal sensor interface system designed for an aircraft specific application.

Ideally, a universal sensor interface system will be aircraft independent; however, a commercially viable realization of a universal sensor interface 80 will likely allow for aircraft-specific customization. One presently preferred embodiment of a universal sensor interface that is designed for aircraft-specific customization is depicted in FIG. 6. As illustrated, one preferred aircraft-specific universal sensor interface 80 includes a two-processor implementation utilizing a CPU module 82 and a universal sensor interface module 84. The CPU module 82 consists of a central processing unit 86 that is coupled with a first serial port 88. Also included on the CPU module 82 is an aircraft interface 90 for communicating the parametric measurements taken by the universal sensor interface 80 with the aircraft's instrumentation and control systems. In the presently preferred embodiment of the invention, the central processing unit 86 comprises an Ada95 host processor module, which is equipped with an IEEE 1394 serial port for communication with the universal sensor interface module 84.

The universal sensor interface module 84 shown in FIG. 6 comprises a second serial port 92, a DSP 94 and a mixed signal component block 96. The second serial port 92 communicates with the first serial port 88, and transmits and receives signals between the CPU module 82 and the universal sensor interface module 84. Operation of the DSP 94 is controlled by signals received from the CPU module 82. The DSP 94 may control many digital devices with its digital output ports giving it versatility for a wide range of use. Once the central processing unit 86 issues a command it is communicated via the first serial port 88 and second serial port 88 to the DSP 94. The DSP 94 then interprets the command and outputs an appropriate signal to the mixed signal component block 96. Based on the information received from the DSP 94, the mixed signal component block 96 generates the appropriate stimulation signal to drive the selected sensor.

Figure 7:
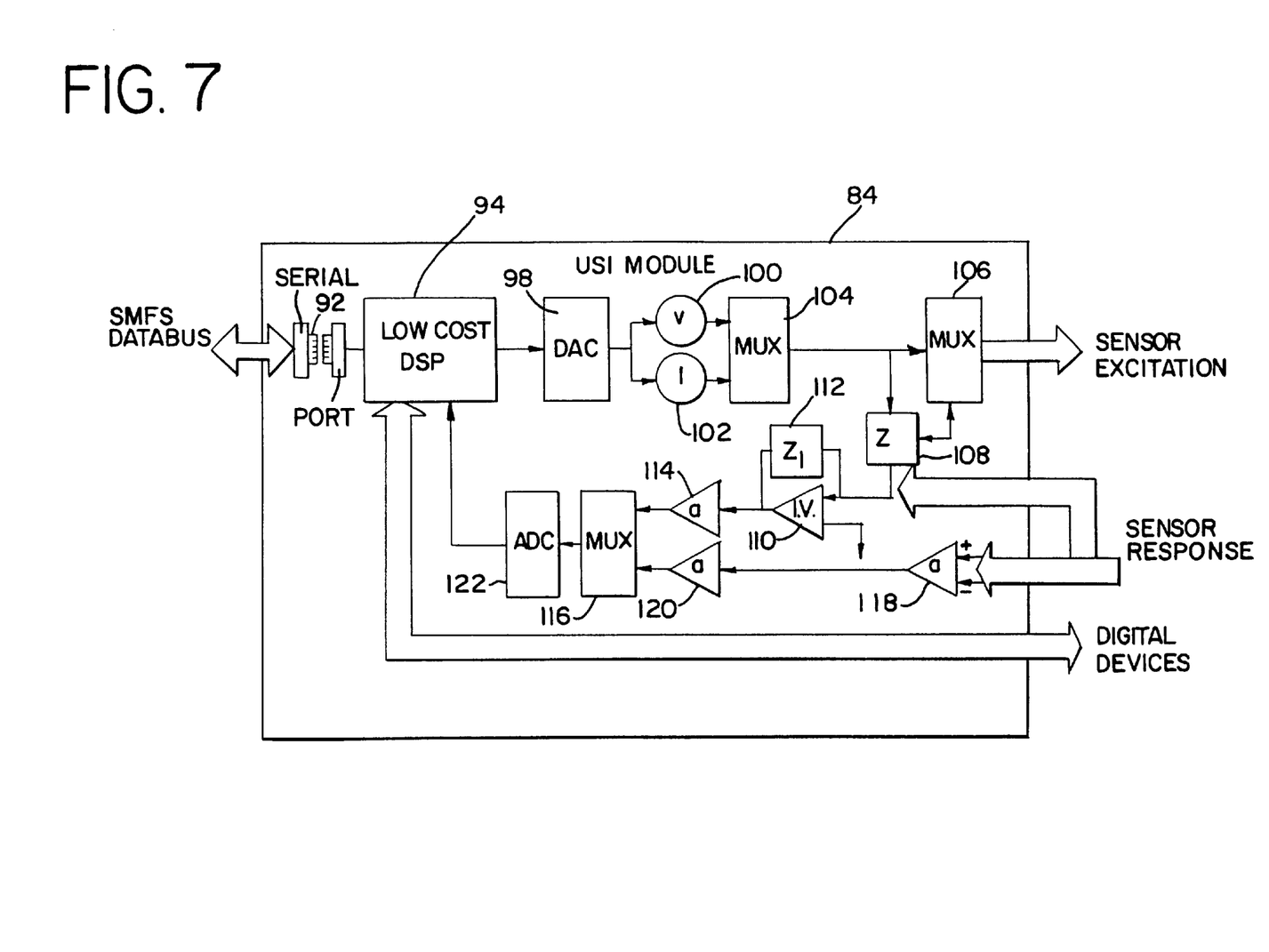
FIG. 7 is a detailed block representation of a universal sensor interface module used in a aircraft specific application.

A detailed diagrammatic illustration of one preferred embodiment of a universal sensor interface module 84 is depicted in FIG. 7. As in other embodiments of the present invention, the DSP 94 is used to control at least one digital to analog converter 98. Based on the information contained in the signal received from the DSP 94, the digital to analog converter 98 will generate a stimulation signal for the sensors. A voltage stimulation signal unit 100 and a current stimulation signal unit 102 may be coupled with the analog output of the digital to analog converter 98 to generate the stimulation signal used to drive the sensors. As previously stated, most sensors require a DC source, an AC source or a CC source in order to produce a valid output response signal.

Figure 8:
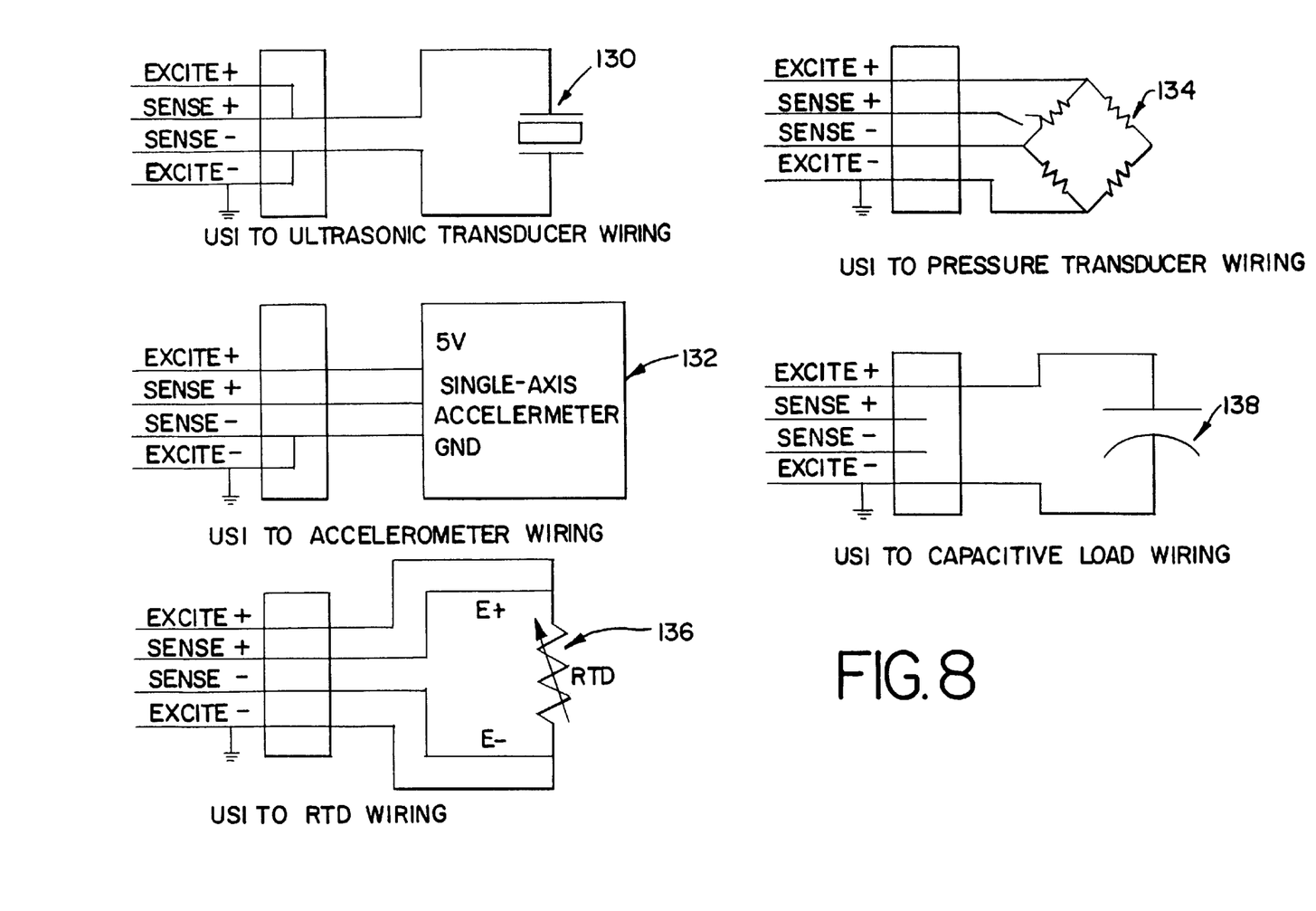
FIG. 8 represents a detailed wiring schematic for various types of four wire sensors utilized in a universal sensor interface system.

A multiplexer 104 is coupled to the output signals of the voltage stimulation signal unit 100 or the current stimulation signal unit 102 to select the appropriate stimulation signal for further transmission. A means 106 for selectively driving a sensor is coupled with the output of the multiplexer 104, which communicates the stimulation signal to the sensors. The sensors use the stimulation signal to produce a response signal in the form of a parametric measurement used by the universal sensor interface 84 to control a particular measurement or control system on board the aircraft. As illustrated in FIG. 8, a ultrasonic transducer 130, accelerometer 132, pressure transducer 134, capacitor 138 and resistive temperature device 136 may all be single sensors that plug into the universal sensor interface 84 through a four-wire connector. In the presently preferred embodiment of the invention, all sensors used in the universal sensor interface 84 are single plug sensors having four wire interfaces.

The output signal of the multiplexer 104 is coupled with the input of a referencing circuit 108. The referencing circuit 108 consists of a means for selectively operating a plurality of precision impedance references. An output signal from the referencing circuit 108 may also be coupled to the means 106 for selectively driving a sensor. This allows the system to generate a reference signal which will give the universal sensor interface system 84 the ability to precisely calculate the output signal from the sensors.

An output signal is communicated from the referencing unit 108 to an amplification means 110, e.g., a current to voltage amplifier, for further conditioning the reference signal. A selectively controllable filtering means 112 may also be coupled with the amplification means 110 for filtering out unwanted or erroneous signals. The output signal from the amplification means 1 10 and filtering means 112 may be coupled with a reference signal amplifier 114, which in turn is coupled to the input channel of a second multiplexer 116. The reference signal that is generated is used by the universal sensor interface 84 to calibrate and adjust the response signals received from the sensors it is driving.

The sensor response signals may pass differentially through a first response signal amplifier circuit 118 and a second response signal amplifier circuit 120 before being communicated to an input channel of the second multiplexer 116. The first response signal amplifier circuit 118 and second response signal amplifier circuit 120 may be used by the system to amplify and condition the signals before being communicated to the input channel on the second multiplexer 116. The signal conditioning may by performed by any means known in the art for filtering, transforming and amplifying a given signal. The second multiplexer 116 uses the reference signal and the sensor response signal to generate an output signal which is coupled to an input of an analog to digital converter 122. The digital output signal from the analog to digital converter 122 is communicated to the DSP 94 for processing and further communication to the CPU module 82 via said serial ports 88, 92. Sensor response can also be received via a single ended input I-V converter 110 and processed the same as the reference signal.

The universal sensor interface is able to provide a common interface for the integration of sensors with consumers of sensor data in an aircraft measurement and control system. The universal sensor interface can be implemented in both aircraft and sensor independently because of its unique and versatile design. The sensor data it can process may consist of any fundamental parameter that may be independently measured by reading a sensor signal on an aircraft. Another benefit of the universal sensor interface over prior art systems is its ability to communicate with almost any sensor type commonly found in an aircraft system.

In addition, the universal sensor interface system can be networked to handle a number of sensors in a universal and systematic method. The universal sensor interface can also be retrofitted into existing aircraft systems without the necessity of replacing every sensor on board the aircraft. Most sensor systems on modern aircraft work independently of one another, and each group of sensors employed requires its own set of complex circuitry. Each sensor on board the aircraft would therefore have to be connected with its own set of circuitry each generating a unique set of excitation signals and response signals. The overall cost associated with adding additional circuitry to each sensor system thus rises dramatically. In addition, the reliability of every sensor system depends on the reliability of each component that makes up the system. Therefore, by decreasing the number of circuits associated with aircraft sensor systems by using a universal sensor interface both the reliability and cost of sensor systems is improved.

Further benefits of the present invention are realized by its automatic sensor recognition capabilities. The universal sensor interface software stimulates the sensors in a way that the system can determine the type of sensor attached to each channel of the system. Ideally, each sensor utilized on the aircraft will plug into the universal sensor interface via a universal four-wire connector. This gives technicians the ability to quickly and easily replace each sensor if it should become defective. If a sensor needs to be replaced by a different type of sensor, or by a newer and better sensor, the technician can simply replace the sensor unit without having to add new circuitry associated with that particular type of sensor. The universal sensor interface software will automatically detect the type of sensor that has been installed and will adjust the system to match that sensor's attributes.

Other benefits are found in the variety of functions that can be performed with the software that is monitoring the universal sensor interface system. By using spectral analysis of response signals from the sensors, the universal sensor interface system is capable of notifying a user, by any suitable graphical user interface or alarm device, that an identified sensor is not responding properly. Not only can the system detect a faulty sensor, but it also has the ability to isolate the cause of the fault. In addition, the universal sensor interface system can give an accurate prediction of when a particular sensor may fail.

The universal sensor interface is also capable of automatically calibrating the sensors during operation by controlling various selectable gain amplifiers and filtering circuits. By automatically calibrating each of the sensors during operation the accuracy of the sensors is improved over prior art systems. The sensor accuracy can be improved by active noise cancellation or adaptive noise cancellation. Active noise cancellation can be accomplished through known filtering means commonly used in the art. Adaptive noise cancellation can be accomplished either by actively generating a noise canceling waveform or by using a noise reference signal to passively filter data through software. Thus, the efficiency and accuracy of sensor operations is improved considerably over the prior art methods of controlling aircraft systems.

Although preferred embodiments of this invention have been disclosed for use in aircraft systems, one skilled in the art would recognize that the universal sensor interface can by utilized in virtually any type of sensor system. For instance, a universal sensor interface could be adapted for automobiles to monitor and control systems which utilize sensor measurements. The interface can also be employed in manufacturing facilities which use a plurality of sensors to monitor system parameters.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents that are intended to define the spirit and scope of this invention.

We claim:

1. A method of automatically determining the sensor configuration in an aircraft sensor system, comprising the steps of:

sending a plurality of initialization signals to a digital signal processor;

converting said initialization signals into a plurality of predetermined sensor check signals with said digital signal processor;

driving a plurality of sensor units with said sensor check signal;

receiving a response signal from each of said sensor units;

comparing each of said response signals with a pre-selected database of sensor responses; and     selecting the appropriate sensor based on said comparison.

2. The method of claim 1, wherein said pre-selected database of sensor responses are stored in a look-up table.

3. The method of claim 1, further comprising the step of using a plurality of serial ports to communicate with said digital signal processor.

4. A method of automatically recognizing sensors for a universal sensor interface, comprising the steps of:
   generating an arbitrary waveform to power a plurality of sensor units;
   acquiring a plurality of sensor response signals from said sensor units;
   converting said acquired sensor response signals into a parametric measurement;
   receiving said parametric measurement; and
   selecting an appropriate sensor type based on a comparison of said parametric measurement.

5. The method of claim 4, further comprising the step of using a look up table to determine the appropriate sensor type.

6. The method of claim 4, wherein said means for generating an arbitrary waveform is controlled by an embedded computer system.

7. The method of claim 4, further comprising the step of analyzing said parametric measurement in order to determine if there has been a sensor error.

8. The method of claim 4, further comprising the step of locating a faulty sensor by analyzing said parametric measurement.

9. A method of initializing a universal sensor interface, comprising the steps of:
   generating a plurality of arbitrary initialization signals;
   outputting said arbitrary initialization signals to a digital processor;
   transforming said arbitrary initialization signals into analog sensor stimulation signals to drive a plurality of sensors;
   directing said sensor stimulation signals to said plurality of sensors;
   receiving a plurality of initialization response signals from said plurality of sensors at said digital processor;
   communicating said sensor response signals from said digital processor; and
   interpreting said initialization response signals according to a predetermined set of sensor responses.

10. The method of claim 9, further comprising the step of using a look up table to interpret said initialization response signals.

11. The method of claim 9, further comprising the step of detecting a faulty initialization response signal.

12. The method of claim 9, further comprising the step of detecting a wiring problem.

13. The method of claim 9, further comprising the step of detecting a malfunctioning sensor.

14. The method of claim 9, further comprising the step of detecting that pin connector assignments must be reconfigured for a sensor.

15. The method of claim 9, further comprising the step of detecting the location and cause of a particular sensor fault.

16. A universal sensor interface system for an aircraft measurement and control system, comprising:
   a central processing unit;
   a standard interface unit connected with said central processing unit for communicating system information to said aircraft measurement and control units;
   a first communication port coupled with said central processing unit;
   a digital signal processing unit having a second communication port coupled with said first communication port on said central processing unit for transferring data between said central processing unit and said digital signal processing unit; and
   a mixed signal unit in communication with said digital signal processor and a plurality of sensors for generating stimulation signals and receiving response signals from said plurality of sensors.

17. The universal sensor interface system for an aircraft measurement and control system of claim 16, wherein said central processing unit further comprises a microprocessor.

18. The universal sensor interface system for an aircraft measurement and control system of claim 16, wherein said first and second communication ports further comprise serial ports.

19. The universal sensor interface system for an aircraft measurement and control system of claim 16, wherein said plurality of sensors have output signals in communication with the input of a second multiplexer.

20. The universal sensor interface system for an aircraft measurement and control system of claim 19, wherein said second multiplexer is coupled with the input of an analog to digital converter.

21. The universal sensor interface system for an aircraft measurement and control system of claim 20, wherein said analog to digital converter has an input coupled with said digital signal processor for communicating the sensor response signal to said digital signal processor.

22. The universal sensor interface system for an aircraft measurement and control system of claim 16, wherein said mixed signal generation unit further comprises a digital to analog converter coupled with said digital signal processor.

23. The universal sensor interface system for an aircraft measurement and control system of claim 22, wherein said digital to analog converter is in communication with a current signal generation unit.

24. The universal sensor interface system for an aircraft measurement and control system of claim 22, wherein said current signal generation unit is coupled with an input on said first multiplexer.

25. The universal sensor interface system for an aircraft measurement and control system of claim 22, wherein said digital to analog converter is in communication with a voltage signal generation unit.

26. The universal sensor interface system for an aircraft measurement and control system of claim 25, wherein said voltage signal generation unit is coupled with an input on a first multiplexer.

27. The universal sensor interface system for an aircraft measurement and control system of claim 26, wherein said first multiplexer has an output coupled with a sensor selection unit for selectively driving a chosen sensor.

28. The universal sensor interface system for an aircraft measurement and control system of claim 26, wherein said first multiplexer has an output coupled with a signal reference unit for calibrating the sensor response signals.

29. The universal sensor interface system for an aircraft measurement and control system of claim 28, wherein said signal reference unit has an output signal coupled with the input of said second multiplexer.

30. A method of providing a universal sensor interface to an aircraft comprising the steps of:
   stimulating a plurality of sensors with a means for selectively driving said sensors with an analog stimulation signal, said sensors being capable of generating aircraft system signals,
   controlling said sensors with said stimulation signal generated by a digital processor,
   sensing said aircraft system signal with an input port of said digital processor, converting said aircraft system signals into parametric outputs; and providing said parametric outputs in a standard format for consumption by other devices.

31. The method of claim 30, further comprising the step of communicating between said digital processor and said other devices through a plurality of serial ports.

32. The method of claim 30, further comprising the step of sending said aircraft system signals to said digital processor with a means connected with the outputs of said sensors for collecting a plurality of sensor response signals and converting them to a digital signal.

33. A universal sensor interface, comprising:

means for generating a plurality of different stimulation signals to drive a plurality of sensors of different types; said generating means including a digital processor having an output coupled to at least one digital to analog converter for selectively driving each sensor of said plurality with an analog stimulation signal based on the sensor type thereof;

means coupled to said plurality of sensors for accepting a plurality of sensor response signals and converting said sensor response signals into parametric measurements having a common format; and means coupled to said means for accepting sensor response signals for outputting said parametric measurements as useable inputs to a sensor data consuming apparatus.

34. The universal sensor interface of claim 33 further comprising means for automatically recognizing sensor types based upon analyzing sensor response signals from said sensors in response to a predetermination stimulation signal.

35. The universal sensor interface of claim 33 further comprising means for analyzing sensor response signals.

36. The universal sensor interface of claim 35 wherein said means for analyzing sensor response signals is operable to detect sensor faults.

37. The universal sensor interface of claim 35 wherein said means for analyzing sensor response signals is operable to predict sensor failures.

38. The universal sensor interface of claim 33 comprising an input multiplexer connected with the output channels of said plurality of sensors.

39. The universal sensor interface of claim 38 further comprising an analog to digital converter connected with said input multiplexer for supplying sensor response signals to said digital processor.

40. The universal sensor interface of claim 30 wherein said digital processor comprises a processor from the group consisting of a micro-processor and a digital signal processor.

41. The universal sensor interface of claim 40 further comprising a first multiplexer coupled with the output of said at least one digital to analog converter for directing said stimulation signal to a predetermined sensor.

42. The universal sensor interface of claim 40 further comprising a voltage controlled current source connected with the output of said at least one digital to analog converter.

43. The universal sensor interface of claim 41 wherein the output channels of said multiplexer is coupled with at least one current/voltage multiplexer.

44. The universal sensor interface of claim 42 wherein an output port of said voltage controlled current source is connected with said at least one current/voltage multiplexer.

45. The universal sensor interface of claim 44 wherein said plurality of sensors have input channels connected with the output port of said current/voltage multiplexer.

46. The universal sensor interface of claim 33 including means for communicating said output signals to a host computer system in an aircraft;

a sensor unit coupled to said means for generating a stimulation signal for sensing aircraft operating parameters and generating an aircraft operating signal; and an analog to digital converter coupled to receive said aircraft operating signals and transform said analog aircraft operating signals to a digital signal for said digital processor.

47. The universal sensor interface of claim 46, wherein said sensor unit comprises at least one accelerometer.

48. The universal sensor interface of claim 46, wherein said sensor unit comprises at least one pressure transducer.

49. The universal sensor interface of claim 46, wherein said sensor unit comprises at least one point level.

50. The universal sensor interface of claim 46, wherein said sensor unit comprises at least one resistance temperature detector.

51. The universal sensor interface of claim 46, wherein said sensor unit comprises at least one DC capacitance probe.

52. The universal sensor interface of claim 46, wherein said sensor unit comprises at least one vibrating-spool densitometers.

53. The universal sensor interface of claim 46, wherein said sensor unit comprises at least one AC capacitance probe.

54. The universal sensor interface of claim 46, wherein said sensor unit comprises at least one ultrasonic fuel transducer.

* * * * *